United States Patent
Su et al.

(10) Patent No.: US 12,033,799 B2
(45) Date of Patent: Jul. 9, 2024

(54) CAPACITOR STRUCTURE AND MANUFACTURING METHOD THEREOF

(71) Applicant: CHANGXIN MEMORY TECHNOLOGIES, INC., Hefei (CN)

(72) Inventors: Xingsong Su, Hefei (CN); Weiping Bai, Hefei (CN); Mengkang Yu, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 247 days.

(21) Appl. No.: 17/601,702

(22) PCT Filed: Jun. 21, 2021

(86) PCT No.: PCT/CN2021/101299
§ 371 (c)(1),
(2) Date: Oct. 5, 2021

(87) PCT Pub. No.: WO2022/166075
PCT Pub. Date: Aug. 11, 2022

(65) Prior Publication Data
US 2023/0103489 A1    Apr. 6, 2023

(30) Foreign Application Priority Data

Feb. 3, 2021   (CN) .......................... 202110150428.4

(51) Int. Cl.
*H01G 4/10*   (2006.01)
*H01G 4/33*   (2006.01)

(52) U.S. Cl.
CPC ................. *H01G 4/10* (2013.01); *H01G 4/33* (2013.01)

(58) Field of Classification Search
CPC .................................. H01G 4/33; H01G 4/10
See application file for complete search history.

(56) References Cited

U.S. PATENT DOCUMENTS

| 8,760,845 B2 | 6/2014 | Rocklein et al. |
| 10,121,652 B1 | 11/2018 | Hegde |
| 2009/0181549 A1* | 7/2009 | Yoneda ............. H01L 21/02192 438/785 |
| 2013/0071988 A1* | 3/2013 | Deweerd ................. H01L 28/40 438/396 |
| 2014/0161706 A1* | 6/2014 | Takezawa ......... H01L 21/02148 423/326 |
| 2018/0096792 A1* | 4/2018 | Shukh .................... H10N 50/10 |
| 2022/0173209 A1* | 6/2022 | Lee ......................... H01L 28/40 |

FOREIGN PATENT DOCUMENTS

| CN | 1933176 A | 3/2007 |
| CN | 101604626 A | 12/2009 |
| CN | 112928210 A | 6/2021 |

OTHER PUBLICATIONS

International Search Report in Application No. PCT/CN2021/101299, mailed on Nov. 9, 2021.

* cited by examiner

*Primary Examiner* — David M Sinclair
(74) *Attorney, Agent, or Firm* — Syncoda LLC; Feng Ma (57) ABSTRACT

A manufacturing method for capacitor structure includes: forming a dielectric layer on a first electrode, wherein the dielectric layer includes metal oxide layers doped with preset oxides, and part of the preset oxide and a metal oxide share oxygen atoms; and forming a second electrode on the dielectric layer, wherein the first electrode, the dielectric layer and the second electrode constitute a capacitor structure.

15 Claims, 10 Drawing Sheets

CAPACITOR STRUCTURE AND MANUFACTURING METHOD THEREOF

CROSS-REFERENCE TO RELATED APPLICATIONS

This application is a national stage of International Application No. PCT/CN2021/101299 filed on Jun. 21, 2021, which claims priority to Chinese Patent Application No. 202110150428.4 filed on Feb. 3, 2021 The disclosures of these applications are hereby incorporated by reference in their entirety.

TECHNICAL FIELD

The present application relates to the field of semiconductor technology, and in particular, to a capacitor structure and a manufacturing method thereof.

BACKGROUND

With the continuous development of science and technology, the application of semiconductor structures is more and more wide, and semiconductor structures with different functions need to be used in the fields of computers, communications, etc. As a charge storage element, the capacitor structure is widely used in semiconductor structures.

The capacitor structure generally includes two opposite electrodes and a dielectric layer between the two electrodes. The material of the dielectric layer is usually oxide, such as zirconium oxide, hafnium oxide or perovskite. As the semiconductor structures continue to be miniaturized, the requirement for charge capacity of the capacitor structure is increasingly high. Said materials cannot meet the requirement for charge capacity and usually need to be doped with other elements. In related technologies, when a doped dielectric layer is manufactured, a metal organic layer is formed, then the metal organic layer is oxidized to form a metal oxide layer, a doped organic layer is formed on the metal oxide layer, the doped organic layer is oxidized to form a doped oxide layer, and the metal oxide layer and the doped oxide layer constitute the doped dielectric layer.

However, the concentration of oxides doped in the doped dielectric layer is relatively high, and the doping effect is poor, which affect the performance of the capacitor structure.

SUMMARY

In view of this, the present application provides a capacitor structure and a manufacturing method thereof to partially improve the technical problem of poor performance of the capacitor structure.

In the first aspect, the present application provides a manufacturing method for capacitor structure, including: forming a dielectric layer on a first electrode, wherein the dielectric layer includes metal oxide layers doped with preset oxides, and part of the preset oxide and a metal oxide share oxygen atoms; and forming a second electrode on the dielectric layer, wherein the first electrode, the dielectric layer and the second electrode constitute a capacitor structure.

The manufacturing method for capacitor structure according to the present application has at least the following advantages:

In the manufacturing method for capacitor structure according to the present application, a dielectric layer is formed on the first electrode, wherein the dielectric layer includes metal oxide layers doped with preset oxides, and part of the preset oxide and a metal oxide share oxygen atoms. Since part of the preset oxide and the metal oxide share oxygen atoms, the oxygen content can be reduced, thereby reducing the influence of the preset oxide on decrease in the dielectric constant of the dielectric layer. Then a second electrode is formed on the dielectric layer to form the capacitor structure, so that the obtained capacitor structure has better performance. In addition, since part of the preset oxide and the metal oxide share oxygen atoms, the doping effect of the preset oxide in the metal oxide layer is good, which further improves the performance of the capacitor structure.

In the second aspect, the present application provides a capacitor structure, including two electrodes arranged oppositely, and a dielectric layer located between the two electrodes and in contact with the two electrodes; wherein the dielectric layer includes metal oxide layers doped with preset oxides, and part of the preset oxide and a metal oxide share oxygen atoms.

The capacitor structure according to the present application has at least the following advantages:

The capacitor structure according to the present application includes two electrodes arranged oppositely and a dielectric layer located between the two electrodes, the dielectric layer is in contact with the two electrodes, the dielectric layer includes metal oxide layers doped with preset oxides, and part of the preset oxide and a metal oxide share oxygen atoms. Since part of the preset oxide and the metal oxide share oxygen atoms, the oxygen content can be reduced, thereby reducing the influence of the preset oxide on decrease in the dielectric constant of the dielectric layer to improve the performance of the capacitor structure; and the doping effect of the preset oxide in the metal oxide layer is good, which further improves the performance of the capacitor structure.

In addition to the technical problems solved by the present application, the technical features constituting the technical solutions, and the beneficial effects brought about by the technical features of these technical solutions as described above, other technical problems that can be solved by the capacitor structure and the manufacturing method thereof according to the present application, other technical features included in the technical solutions, and the beneficial effects brought by these technical features will be further described in detail in specific implementations.

DETAILED DESCRIPTION

A capacitor structure usually includes two electrodes arranged oppositely and a dielectric layer located between the two electrodes. The dielectric layer may include a doped metal oxide layer, for example, hafnium oxide doped with silicon oxide or zirconium oxide doped with silicon oxide.

In related technologies, when the above capacitor structure is manufactured, a metal organic layer is generally formed, and then the metal organic layer is oxidized to form a metal oxide layer; a preset organic layer is formed on the metal oxide layer, the preset organic layer is oxidized to form a preset oxide layer, and the preset oxide layer and the metal oxide layer form a doped metal oxide layer. However, the dielectric layer formed by the above method has a high degree of oxidation of the preset organic layer, resulting in a relatively high concentration of the preset oxide. On the other hand, the preset oxide layer and the metal oxide layer are arranged in layers, resulting in poor doping effect of the preset oxide.

An embodiment of the present application provides a manufacturing method for capacitor structure. In the method, when the dielectric layer is formed, part of a metal oxide in a metal oxide layer and part of a preset oxide doped in the metal oxide layer share oxygen atoms. Since part of the preset oxide and part of the metal oxide share oxygen atoms, the oxygen content in the metal oxide layer can be reduced, thereby reducing the influence of the preset oxide on decrease in the dielectric constant of the dielectric layer.

In order to make the objectives, technical solutions and advantages of the embodiments of the present application clearer, the technical solutions in the embodiments of the present application will be described clearly and completely below in conjunction with the accompanying drawings in the embodiments of the present application. Apparently, the described embodiments are part of the embodiments of the present application, not all of them. All other embodiments obtained by those of ordinary skill in the art without creative efforts based on the embodiments of the present application shall fall within the protection scope of the present application.

Figure 1:
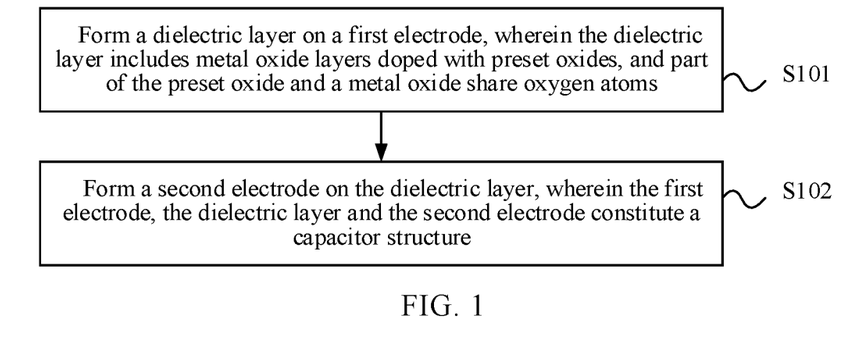
FIG. 1 is a flowchart of a manufacturing method for capacitor structure in an embodiment of the present application.

Referring to FIGS. 1 to 14, FIG. 1 is a flowchart of a manufacturing method for capacitor structure in an embodiment of the present application, and FIGS. 2 to 14 are schematic structure diagrams of a capacitor structure at various stages in the manufacturing process. The manufacturing method for capacitor structure will be introduced below in conjunction with FIGS. 1 to 14. The manufacturing method for capacitor structure includes the following steps:

Step S101, a dielectric layer is formed on a first electrode, wherein the dielectric layer includes metal oxide layers doped with preset oxides, and part of the preset oxide and the metal oxide share oxygen atoms.

The first electrode 10 may be a metal electrode. For example, the material of the first electrode 10 may be one or more of aluminum (Al), copper (Cu), silver (Ag), gold (Au), molybdenum (Mo), nickel (Ni), cobalt (Co), titanium (Ti), or tungsten (W). Exemplarily, the first electrode 10 in the embodiment of the present application may be a titanium nitride (TiN) electrode.

The first electrode 10 may be formed by deposition. For example, the first electrode 10 is formed by Chemical Vapor Deposition (CVD), Physical Vapor Deposition (PVD), or Atomic Layer Deposition (ALD). Of course, the embodiment of the present application is not limited to this. The first electrode 10 may also be formed by other processes, such as electroplating.

After the first electrode 10 is provided, the dielectric layer is formed on the first electrode 10. The dielectric layer includes metal oxide layers doped with preset oxides 20. The preset oxide includes a non-metal oxide, and part of the preset oxide and the metal oxide share oxygen atoms 3.

For example, non-metal atoms 2 in the preset oxide may share the oxygen atoms 3 with metal atoms 1 in the metal oxide to reduce oxygen content. In the metal oxide layer doped with a preset oxide 20, the mass percentage of the metal oxide is 90% to 99%, and the mass percentage of the non-metal oxide is 1% to 10%.

Figure 2:
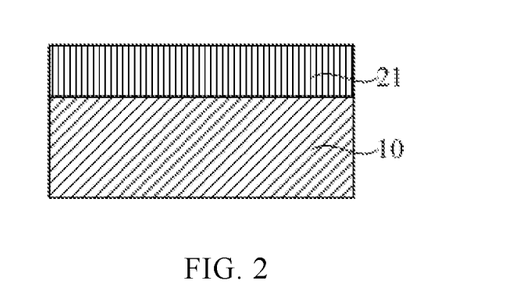
FIG. 2 is a schematic structure diagram after a metal organic layer is formed on a first electrode in an embodiment of the present application.
Figure 3:
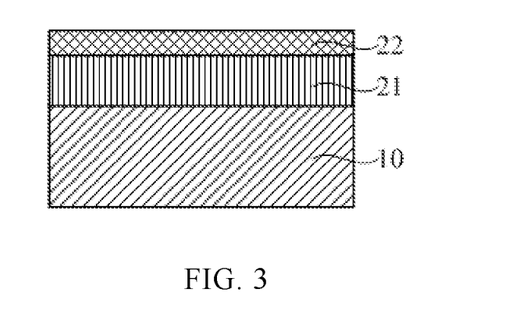
FIG. 3 is a schematic structure diagram after a preset organic layer is formed in an embodiment of the present application.
Figure 4:
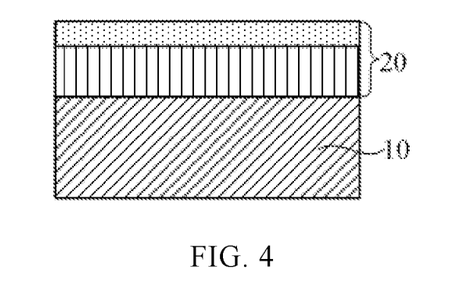
FIG. 4 is a schematic structure diagram after a metal oxide layer doped with a preset oxide is formed in an embodiment of the present application.

Exemplarily, referring to FIGS. 2 to 4, the metal oxide layer doped with a preset oxide in the dielectric layer may be formed by the following process:

Referring to FIG. 2, a metal organic layer 21 is formed on the first electrode 10. The metal organic layer 21 may include one or more of hafnium, zirconium, barium, or strontium. The metal organic layer 21 may be formed on the first electrode 10 by deposition. For example, the metal organic layer 21 is formed on the first electrode 10 by atomic layer deposition.

Referring to FIG. 3, a preset organic layer 22 is formed on the metal organic layer 21. The preset organic layer 22 may be a non-metal organic layer, and the non-metal organic layer may include a non-metal such as silicon. The non-metal organic layer may be formed on the metal organic layer 21 by deposition. For example, the non-metal organic layer is formed on the metal organic layer 21 by atomic layer deposition.

Referring to FIG. 4, the metal organic layer 21 and the preset organic layer 22 are oxidized to form the metal oxide layer doped with a preset oxide 20. In the metal oxide layer 20 formed, the metal oxide may include hafnium oxide, zirconium oxide or perovskite, such as barium titanate ($BaTiO_3$) or strontium titanate ($SrTiO_3$). The doped preset oxide may include silicon oxide.

In the embodiment of the present application, the metal organic layer 21 and the preset organic layer 22 may be oxidized with ozone ($O_3$), so that a metal organic is oxidized to the metal oxide, and a preset organic is oxidized to the preset oxide. The oxidation time may be less than or equal to 10 min, so that the metal organic and the preset organic are fully oxidized.

Figure 5:
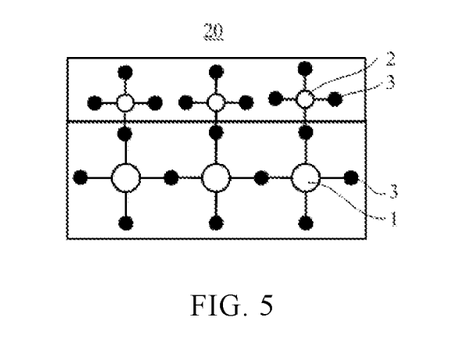
FIG. 5 is a schematic diagram illustrating that oxygen atoms are shared in the formed metal oxide layer doped with a preset oxide in an embodiment of the present application.

As shown in FIG. 5, in the metal oxide layer doped with a preset oxide 20, part of the preset oxide and part of the metal oxide share oxygen atoms 3, which reduces the oxygen content in the metal oxide layer doped with a preset oxide 20, to reduce the influence of the preset oxide on decrease in the dielectric constant of the dielectric layer, thereby improving the performance of the capacitor structure. In addition, part of the preset oxide and part of the metal oxide share oxygen atoms 3, which can also avoid delamination of the preset oxide and the metal oxide, thereby further improving the performance of the capacitor structure.

Step S102, a second electrode is formed on the dielectric layer, wherein the first electrode, the dielectric layer and the second electrode constitute a capacitor structure.

Figure 6:
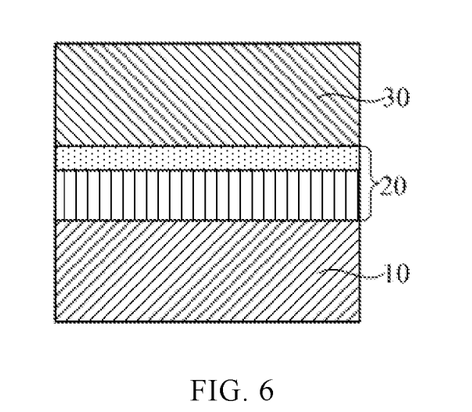
FIG. 6 is a schematic structure diagram after a second electrode is formed in an embodiment of the present application.
Figure 7:
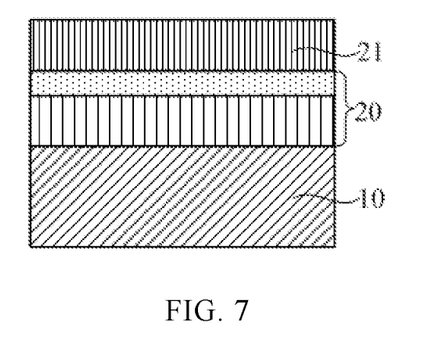
FIG. 7 is a schematic structure diagram after a metal organic layer is formed on the metal oxide layer doped with a preset oxide in an embodiment of the present application.

Referring to FIG. 6, the second electrode 30 may be a metal electrode. For example, the second electrode 30 may be a titanium nitride electrode. The material and formation of the second electrode 30 may be referred to the first electrode 10, and details are not described herein again. The first electrode 10, the dielectric layer and the second electrode 30 constitute a capacitor structure.

In the manufacturing method for capacitor structure according to the embodiment of the present application, a dielectric layer is formed on the first electrode 10, wherein the dielectric layer includes metal oxide layer doped with preset oxides 20, and part of the preset oxide and the metal oxide share oxygen atoms 3. Since part of the preset oxide and the metal oxide share oxygen atoms 3, the concentration of the preset oxide can be reduced, thereby reducing the influence of the preset oxide on the dielectric constant of the dielectric layer. Then a second electrode 30 is formed on the dielectric layer to form the capacitor structure, so that the obtained capacitor structure has better performance. In addition, since part of the preset oxide and the metal oxide share oxygen atoms 3, the preset oxide in the metal oxide layer has good doping effect and relatively good density.

In the embodiment of the present application, the step of forming a dielectric layer on a first electrode 10 further includes: purging the metal organic layer 21; and/or purging the preset organic layer 22. For example, the metal organic and/or the preset organic are purged to reduce surface residues thereof, so as to reduce pollution and impact on subsequent processes.

Exemplarily, the purging may be performed after the step of forming the metal organic layer 21 on the first electrode 10 and after the step of forming the preset organic layer 22 on the metal organic layer 21. The purging time may be 0 to 10 min, and the purging gas may include nitrogen ($N_2$) or argon (Ar). Of course, the embodiment of the present application is not limited to this. The purging gas may also be other inert gas.

In the embodiment of the present application, after the step of oxidizing the metal organic layer 21 and the preset organic layer 22 to form the metal oxide layer doped with a preset oxide 20, before the step of forming the second electrode 30 on the dielectric layer, the manufacturing method for capacitor structure further includes:

A metal organic layer 21 is formed on the metal oxide layer doped with a preset oxide. Exemplarily, referring to FIG. 7, the metal organic layer 21 may be a non-metal organic layer, which is formed on the metal oxide layer doped with a preset oxide 20 by atomic layer deposition.

Figure 8:
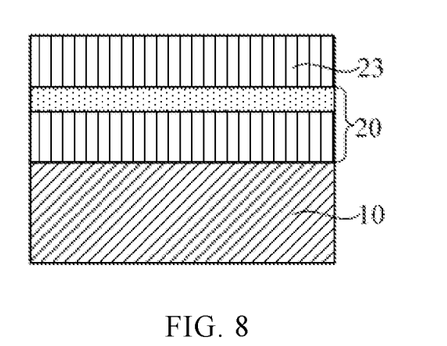
FIG. 8 is a schematic structure diagram after an undoped metal oxide layer is formed in an embodiment of the present application.

As shown in FIG. 8, after the metal organic layer 21 is formed, the metal organic layer 21 is oxidized to form an undoped metal oxide layer 23. Exemplarily, the oxidation gas may be ozone, and the oxidation time may be 0 to 10 min. The metal oxide in the undoped metal oxide layer 23 may be the same as or different from the metal oxide in the metal oxide layer doped with a preset oxide 20, which is not limited in the embodiment of the present application.

In the embodiment of the present application, after the step of oxidizing the metal organic layer 21 and the preset organic layer 22 to form the metal oxide layer doped with a preset oxide 20, before the step of forming the second electrode 30 on the dielectric layer, the manufacturing method for capacitor structure further includes:

A metal organic layer is formed on the metal oxide layer doped with a preset oxide. A preset organic layer is formed on the metal organic layer. The metal organic layer and the preset organic layer are oxidized to form a metal oxide layer doped with a preset oxide. The steps of forming a metal organic layer on the metal oxide layer doped with a preset oxide, forming a preset organic layer on the metal organic layer, and oxidizing the metal organic layer and the preset organic layer are repeated, until N-1 metal oxide layers doped with preset oxides 20 are formed. At this time, the dielectric layer includes N metal oxide layers doped with preset oxides 20.

That is, when the dielectric layer includes N metal oxide layers doped with preset oxides 20, a metal oxide layer doped with a preset oxide 20 is first formed on the first electrode 10, and then the remaining N-1metal oxide layers doped with preset oxides 20 are formed on this layer. The manufacturing of the remaining N-1metal oxide layers doped with preset oxides 20 may be referred to this layer.

Figure 9:
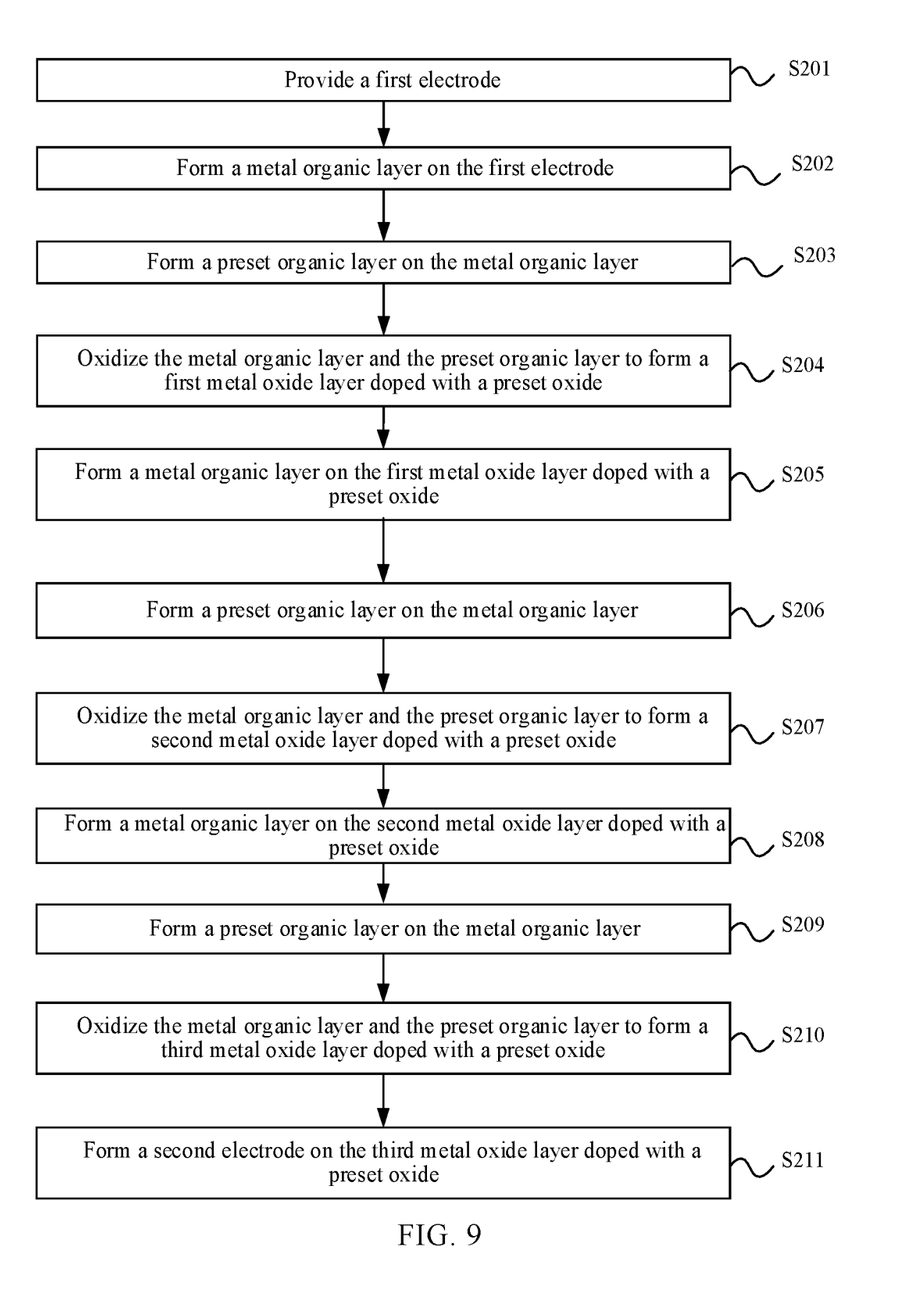
FIG. 9 is a flowchart of forming three metal oxide layers doped with preset oxides in an embodiment of the present application.
Figure 10:
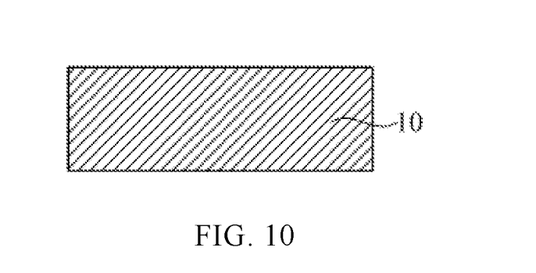
FIG. 10 is a schematic structure diagram after the first electrode is provided in an embodiment of the present application.

Exemplarily, when the dielectric layer includes three metal oxide layers doped with preset oxides 20, referring to FIG. 9, the manufacturing method for capacitor structure includes the following steps:

Step S201, a first electrode is provided, as shown in FIG. 10.

Step S202, a metal organic layer is formed on the first electrode.

Step S203, a preset organic layer is formed on the metal organic layer.

Figure 11:
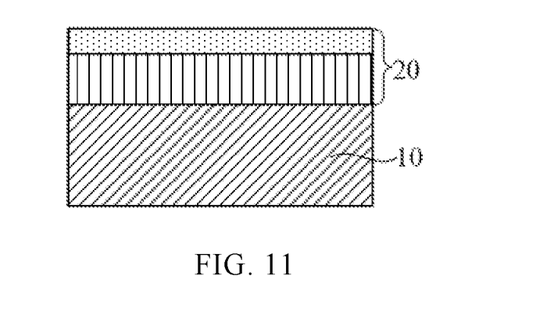
FIG. 11 is a schematic structure diagram after a first metal oxide layer doped with a preset oxide is formed in an embodiment of the present application.

Step S204, the metal organic layer and the preset organic layer are oxidized to form a first metal oxide layer doped with a preset oxide, as shown in FIG. 11.

Step S205, a metal organic layer is formed on the first metal oxide layer doped with a preset oxide.

Step S206, a preset organic layer is formed on the metal organic layer.

Figure 12:
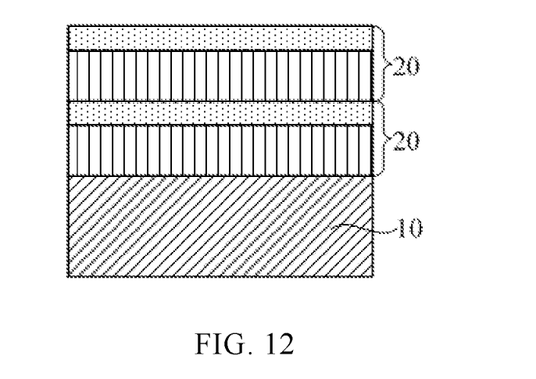
FIG. 12 is a schematic structure diagram after a second metal oxide layer doped with a preset oxide is formed in an embodiment of the present application.

Step S207, the metal organic layer and the preset organic layer are oxidized to form a second metal oxide layer doped with a preset oxide, as shown in FIG. 12.

Step S208, a metal organic layer is formed on the second metal oxide layer doped with a preset oxide.

Step S209, a preset organic layer is formed on the metal organic layer.

Figure 13:
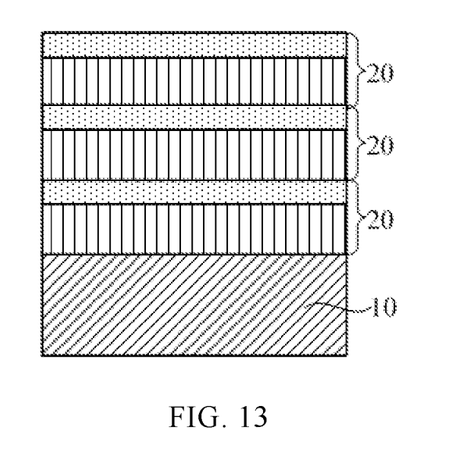
FIG. 13 is a schematic structure diagram after a third metal oxide layer doped with a preset oxide is formed in an embodiment of the present application.

Step S210, the metal organic layer and the preset organic layer are oxidized to form a third metal oxide layer doped with a preset oxide, as shown in FIG. 13.

Figure 14:
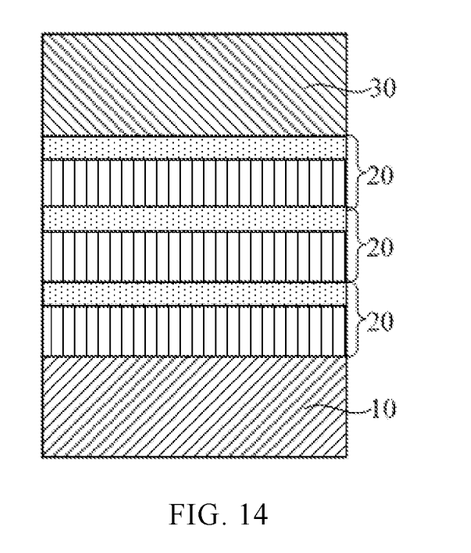
FIG. 14 is a schematic structure diagram after a second electrode is formed on the third metal oxide layer doped with a preset oxide in an embodiment of the present application.

Step S211, a second electrode is formed on the third metal oxide layer doped with a preset oxide. Referring to FIG. 14, the first electrode 10, the second electrode 30, and the three metal oxide layers doped with preset oxides 20 located between the first electrode 10 and the second electrode 30 constitute a capacitor structure in the embodiment of the present application.

Figure 15:
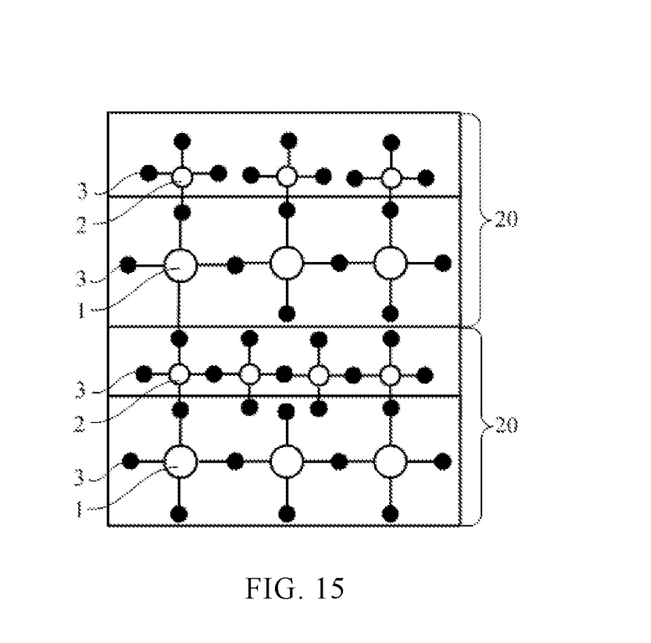
FIG. 15 is a schematic diagram illustrating that two adjacent metal oxide layers doped with preset oxides share oxygen atoms in an embodiment of the present application.

It should be noted that the preset oxides and the metal oxides in the metal oxide layers doped with preset oxides 20 may be the same or different. Referring to FIG. 15, in two adjacent metal oxide layers, the metal oxide in the upper metal oxide layer and the preset oxide in the lower metal oxide layer may share one oxygen atom, and the number of oxygen atoms shared by the metal oxides and the preset oxides in the two layers is less than that shared by the metal oxide and the preset oxide in the same layer.

In the embodiment of the present application, the mass percentage of the non-metal oxide in each metal oxide layer doped with a preset oxide 20 may be different. Exemplarily, when the dielectric layer includes two metal oxide layers doped with preset oxides 20, the mass percentages of the non-metal oxides in the two metal oxide layers 20 may be different.

For example, the mass percentage of the non-metal oxide in the upper metal oxide layer 20 is less than that of the non-metal oxide in the lower metal oxide layer 20. It can be understood that the doping concentration of the upper metal oxide layer 20 is relatively low, while the doping concentration of the lower metal oxide layer 20 is relatively high.

When the lower metal oxide layer 20 is formed, after the metal organic layer and the preset organic layer are oxidized, covalent bonds of metal atoms, oxygen atoms and preset atoms are formed in the interface between the original metal organic layer and the preset organic layer, for example, metal-oxygen-non-metal covalent bonds are formed, and part of the metal oxide and part of the preset oxide are also present in the interface.

When the lower metal oxide layer 20 is formed, after the metal organic layer and the preset organic layer are oxidized, most or all of preset atoms in the interface between the original metal organic layer and the preset organic layer form covalent bonds of metal atoms, oxygen atoms and the preset atoms, for example, most or all of the preset atoms form metal-oxygen-non-metal covalent bonds, and part of the metal oxide is present in the original metal organic layer.

It should be noted that in the embodiment of the present application, a metal organic layer 21, a preset organic layer 22, a metal organic layer 21, a preset organic layer 22, a metal organic layer 21, and a preset organic layer 22 may be sequentially deposited on the first electrode 10, and then the three metal organic layers 21 and the three preset organic layers 22 are simultaneously oxidized.

An embodiment of the present application further provides a capacitor structure. The capacitor structure includes two electrodes and a dielectric layer, the two electrodes are usually arranged oppositely, and the dielectric layer is located between the two electrodes and is in contact with the two electrodes. For ease of description, one of the electrodes is a first electrode, and the other electrode is a second electrode.

Figure 16:
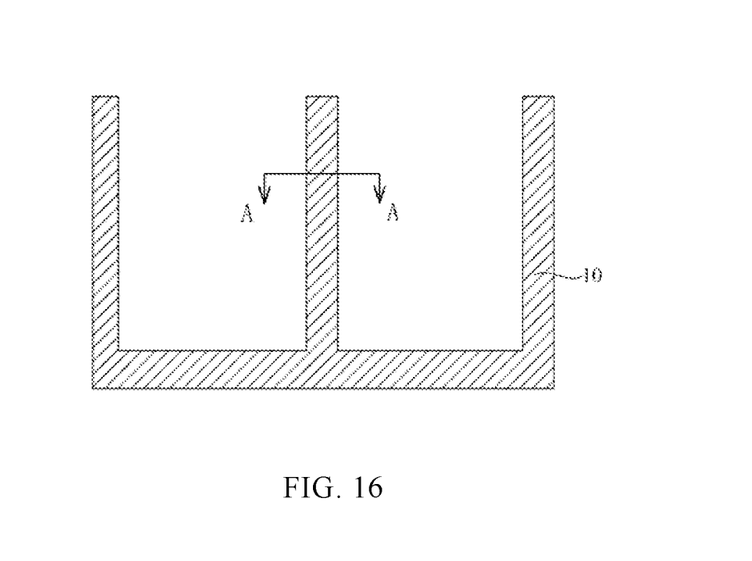
FIG. 16 is a schematic structure diagram of a first electrode of a capacitor structure in an embodiment of the present application.
Figure 17:
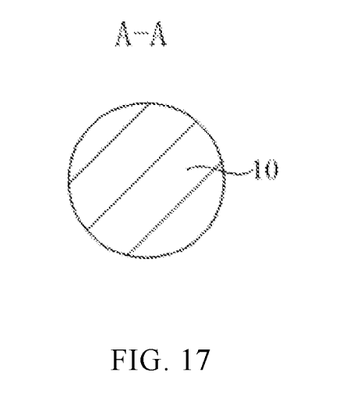
FIG. 17 is a cross-sectional view at A in FIG. 16.

Referring to FIGS. 16 to 21, the first electrode 10 may include a plurality of electrode columns and a bottom plate connecting the electrode columns, and the second electrode 30 may include a plurality of electrode sleeves and a connecting plate connecting the electrode sleeves. The electrode sleeves correspond to the electrode columns one to one, and the electrode sleeves are sleeved outside the corresponding electrode columns. As shown in FIGS. 16 and 17, the cross section of the electrode column may be circular, and the cross section of the electrode sleeve may be ring-shaped.

The first electrode 10 and the second electrode 30 may be metal electrodes. For example, the material of the first electrode 10 and the second electrode 30 may be titanium nitride (TiN), and the first electrode 10 and the second electrode 30 may be formed by deposition.

The dielectric layer is filled between the first electrode 10 and the second electrode 30. The dielectric layer may include metal oxide layers doped with preset oxides 20, and part of the preset oxide and the metal oxide share oxygen atoms. Exemplarily, the metal oxide may include hafnium oxide, zirconium oxide or perovskite, and the preset oxide may include a non-metal oxide, such as silicon oxide.

The metal oxide layer doped with a preset oxide 20 may be formed by the following steps: forming a metal organic layer 21; forming a preset organic layer 22 on the metal organic layer 21; and oxidizing the metal organic layer 21 and the preset organic layer 22 to form the metal oxide layer doped with a preset oxide 20.

The metal organic layer 21 and the preset organic layer 22 may be formed by atomic layer deposition to form relatively thin films. The oxidation gas may be ozone, and the oxidation time is 0 to 10 min, so that a metal organic and a preset organic are fully oxidized.

In the embodiment of the present application, part of the preset oxide and the metal oxide share oxygen atoms, so that the oxygen content in the metal oxide layer doped with a preset oxide 20 is reduced, and the influence of the preset oxide on decrease in the dielectric constant of the dielectric layer is reduced, thereby improving the performance of the capacitor structure. In addition, part of the preset oxide and the metal oxide share oxygen atoms, which can also reduce or avoid delamination of the preset oxide and the metal oxide, thereby improving the doping effect of the preset oxide and further improving the performance of the capacitor structure.

Exemplarily, the capacitor structure in the embodiment of the present application may be formed by the following process: providing a substrate with a plurality of spaced capacitor contacts; forming a support layer on the substrate, the support layer being formed with a plurality of capacitor holes with a relatively high aspect ratio, and each capacitor hole exposing a corresponding capacitor contact; forming a first electrode on an inner surface of the capacitor holes; forming a dielectric layer on the first electrode; forming a second electrode on the dielectric layer, the second electrode filling in the capacitor holes; wherein the dielectric layer may include metal oxide layers doped with preset oxides 20.

It should be noted that the dielectric layer may include at least two metal oxide layers doped with preset oxides 20, and the at least two metal oxide layers doped with preset oxides 20 are stacked. Exemplarily, the dielectric layer includes three metal oxide layers doped with preset oxides 20, as shown in FIGS. 18 and 19, the three metal oxide layers doped with preset oxides 20 are sequentially sleeved on the first electrode 10 from inside to outside, and the layers are in contact with each other.

Figure 18:
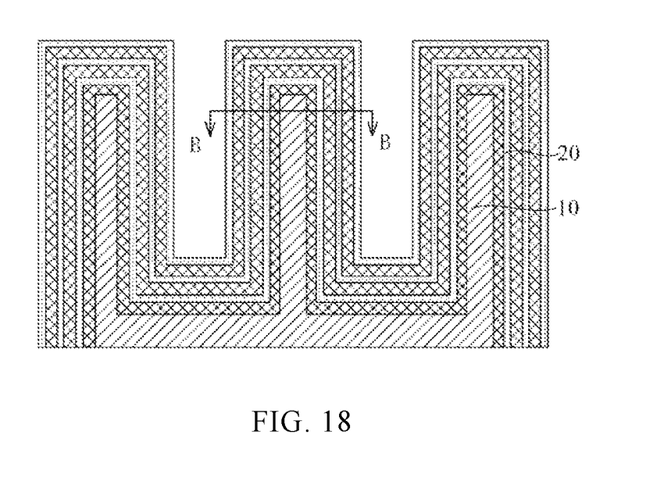
FIG. 18 is a schematic structure diagram of a dielectric layer of the capacitor structure in an embodiment of the present application.
Figure 19:
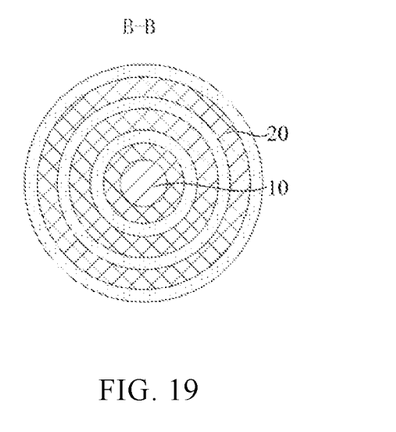
FIG. 19 is a cross-sectional view at B in FIG. 18.
Figure 20:
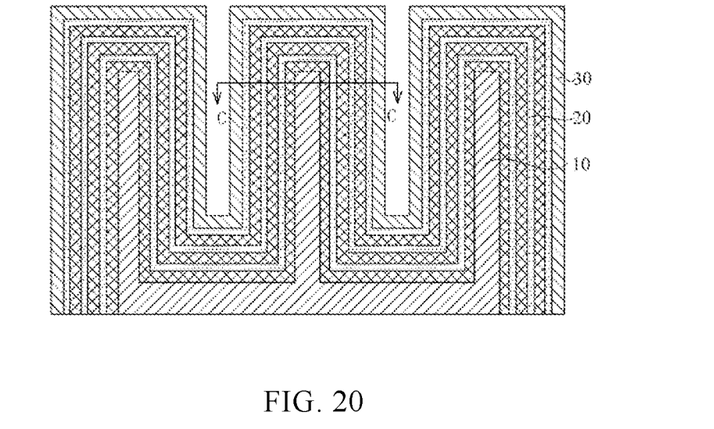
FIG. 20 is a schematic structure diagram of a capacitor structure in an embodiment of the present application.
Figure 21:
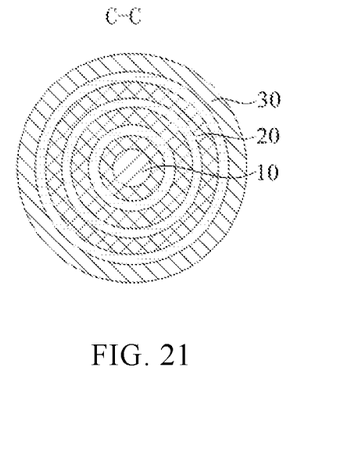
FIG. 21 is a cross-sectional view at C in FIG. 20.

When the dielectric layer includes three metal oxide layers doped with preset oxides 20, as shown in FIGS. 16 and 17, when a capacitor structure is formed, a first electrode 10 is provided; as shown in FIGS. 18 and 19, three metal oxide layers doped with preset oxides 20 are sequentially formed on the first electrode 10; as shown in FIGS. 20 and 21, a second electrode 30 is formed on the outermost metal oxide layer doped with a preset oxide 20, so as to form the capacitor structure.

It should be noted that the dielectric layer may also include undoped metal oxide layers, and the undoped metal oxide layers and the metal oxide layers doped with preset oxides 20 are stacked. Exemplarily, the metal oxide layer doped with a preset oxide 20 is disposed on the first electrode 10, and the undoped metal oxide layer is disposed on the metal oxide layer doped with a preset oxide 20. A plurality of undoped metal oxide layers and a plurality of metal oxide layers doped with preset oxides 20 may be disposed, which are not limited in the embodiment of the present application.

The capacitor structure according to the embodiment of the present application includes two electrodes arranged oppositely and a dielectric layer located between the two electrodes, the dielectric layer is in contact with the two electrodes, the dielectric layer includes metal oxide layers doped with preset oxides, and part of the preset oxide and the metal oxide share oxygen atoms. Since part of the preset oxide and the metal oxide share oxygen atoms, the oxygen content can be reduced, thereby reducing the influence of the preset oxide on decrease in the dielectric constant of the dielectric layer to improve the performance of the capacitor structure; and the doping effect of the preset oxide is good, which further improves the performance of the capacitor structure.

The embodiments or implementations in this specification are described in a progressive manner, each embodiment focuses on the differences from other embodiments, and the same or similar parts between the various embodiments may be referred to each other.

In the description of this specification, the descriptions with reference to the terms "one embodiment", "some embodiments", "exemplary embodiment", "example", "specific example", or "some examples", etc. mean that specific features, structures, materials or characteristics described in conjunction with the embodiments or examples are included in at least one embodiment or example of the present application. In this specification, the schematic descriptions of the above terms do not necessarily refer to the same embodiment or example. Moreover, the described specific features, structures, materials or characteristics can be combined in an appropriate manner in any one or more embodiments or examples.

Finally, it should be noted that the above embodiments are merely intended to describe, but not to limit, the technical solutions of the present application. Although the present application is described in detail with reference to the above embodiments, those of ordinary skill in the art should understand that various modifications may be made to the technical solutions described in the foregoing embodiments or equivalent substitutions may be made to some or all technical features thereof, and these modifications or substitutions do not make the essences of the corresponding technical solutions depart from the scope of the technical solutions of the embodiments of the present application.

What is claimed is:

1. A manufacturing method for capacitor structure, comprising:

forming a dielectric layer on a first electrode;
wherein the dielectric layer comprises a metal oxide layer doped with a preset oxide, the metal oxide layer doped with the preset oxide comprises stacked metal oxide layer and preset oxide layer, and an interface between the metal oxide layer and the preset oxide layer;
wherein the interface between the metal oxide layer and the preset oxide layer comprises metal-oxygen-nonmetal covalent bonds, part of the preset oxide and the metal oxide share oxygen atoms, which reduces a oxygen content in the metal oxide layer doped with the preset oxide and avoids delamination of the preset oxide layer and the metal oxide layer;
wherein the metal oxide comprises hafnium oxide, zirconium oxide or perovskite, and the preset oxide comprises silicon oxide; and
forming a second electrode on the dielectric layer, wherein the first electrode, the dielectric layer and the second electrode constitute a capacitor structure.

2. The manufacturing method for capacitor structure of claim 1, wherein a step of forming the dielectric layer on the first electrode comprises:

forming a first metal organic layer on the first electrode;
forming a first preset organic layer on the first metal organic layer; and
oxidizing the first metal organic layer and the first preset organic layer to form a first metal oxide layer doped with the preset oxide.

3. The manufacturing method for capacitor structure of claim 2, wherein after a step of the oxidizing the first metal organic layer and the first preset organic layer to form the first metal oxide layer doped with the preset oxide, before a step of forming the second electrode on the dielectric layer, the manufacturing method for capacitor structure further comprises:

forming a third metal organic layer on the first metal oxide layer doped with the preset oxide; and
oxidizing the third metal organic layer to form an undoped metal oxide layer.

4. The manufacturing method for capacitor structure of claim 2, wherein after a step of the oxidizing the first metal organic layer and the first preset organic layer to form the first metal oxide layer doped with the preset oxide, before a step of forming the second electrode on the dielectric layer, the manufacturing method for capacitor structure further comprises:

S1: forming a second metal organic layer on the first metal oxide layer doped with the preset oxide;
S2: forming a second preset organic layer on the second metal organic layer;
S3: oxidizing the second metal organic layer and the second preset organic layer to form a second metal oxide layer doped with the preset oxide; and
repeating steps of S1 to S3, until the dielectric layer comprising N metal oxide layers doped with preset oxides is formed, wherein N is greater than or equal to 2.

5. The manufacturing method for capacitor structure of claim 2, wherein in the step of forming the dielectric layer on the first electrode, the first metal organic layer and the first preset organic layer are formed by atomic layer deposition process.

6. The manufacturing method for capacitor structure of claim 5, wherein in the step of forming the dielectric layer on the first electrode comprises:

at least one of purging the first metal organic layer or purging the first preset organic layer.

7. The manufacturing method for capacitor structure of claim 2, wherein in a step of the oxidizing the first metal organic layer and the first preset organic layer, the first metal organic layer and the first preset organic layer are oxidized with ozone.

8. The manufacturing method for capacitor structure of claim 7, wherein an oxidation time is less than or equal to 10 min.

9. The manufacturing method for capacitor structure of claim 1, wherein a mass percentage of the metal oxide is 90% to 99%, and a mass percentage of the preset oxide is 1% to 10%.

10. The manufacturing method for capacitor structure of claim 1, wherein a step of forming the dielectric layer on the first electrode comprises:
   forming a first metal organic layer on the first electrode;
   forming a first preset organic layer on the first metal organic layer; and
   oxidizing the first metal organic layer and the first preset organic layer to form a first metal oxide layer doped with the preset oxide;
   wherein a mass percentage of the metal oxide is 90% to 99%, and a mass percentage of the preset oxide is 1% to 10%.

11. The manufacturing method for capacitor structure of claim 1, wherein a step of forming the dielectric layer on the first electrode comprises:
   forming a first metal organic layer on the first electrode;
   forming a first preset organic layer on the first metal organic layer; and
   oxidizing the first metal organic layer and the first preset organic layer to form a first metal oxide layer doped with the preset oxide;
   wherein after a step of the oxidizing the first metal organic layer and the first preset organic layer to form the first metal oxide layer doped with the preset oxide, before a step of forming the second electrode on the dielectric layer, the manufacturing method for capacitor structure further comprises:
   forming a third metal organic layer on the first metal oxide layer doped with the preset oxide; and
   oxidizing the third metal organic layer to form an undoped metal oxide layer;
   wherein a mass percentage of the metal oxide is 90% to 99%, and a mass percentage of the preset oxide is 1% to 10%.

12. A capacitor structure, comprising two electrodes arranged oppositely, and a dielectric layer located between the two electrodes and in contact with the two electrodes;
   wherein the dielectric layer comprises a metal oxide layer doped with a preset oxide, the metal oxide layer doped with the preset oxide comprises stacked metal oxide layer and preset oxide layer, and an interface between the metal oxide layer and the preset oxide layer;
   wherein the interface between the metal oxide layer and the preset oxide layer comprises metal-oxygen-non-metal covalent bonds, part of the preset oxide and the metal oxide share oxygen atoms, which reduces a oxygen content in the metal oxide layer doped with the preset oxide and avoids delamination of the preset oxide layer and the metal oxide layer;
   wherein the metal oxide comprises hafnium oxide, zirconium oxide or perovskite, and the preset oxide comprises silicon oxide.

13. The capacitor structure of claim 12, wherein the preset oxide is a non-metal oxide, a mass percentage of the metal oxide is 90% to 99%, and a mass percentage of the preset oxide is 1% to 10%.

14. The capacitor structure of claim 12, wherein the dielectric layer comprises at least two metal oxide layers doped with preset oxides, and the at least two metal oxide layers doped with preset oxides are stacked.

15. The capacitor structure of claim 12, wherein the dielectric layer further comprises an undoped metal oxide layer, and the undoped metal oxide layer and the metal oxide layer doped with the preset oxide are stacked.

* * * * *